(12) United States Patent
Palmour

(10) Patent No.: US 6,302,401 B1
(45) Date of Patent: Oct. 16, 2001

(54) STUFFING BOX SEAL ASSEMBLY

(75) Inventor: Harold H. Palmour, Livingston, TX (US)

(73) Assignee: The Palmour Group, Livingston, TX (US)

( * ) Notice: Subject to any disclaimer, the term of this patent is extended or adjusted under 35 U.S.C. 154(b) by 0 days.

(21) Appl. No.: 09/347,393

(22) Filed: Jul. 6, 1999

Related U.S. Application Data

(60) Provisional application No. 60/091,941, filed on Jul. 7, 1998.

(51) Int. Cl.[7] .................................................. F16S 15/26
(52) U.S. Cl. ................................................................. 277/513
(58) Field of Search .............................. 277/318, 510, 277/513

(56) References Cited

U.S. PATENT DOCUMENTS

| | | |
|---|---|---|
| 2,155,628 | 4/1939 | Williams . |
| 3,161,413 | 12/1964 | Audemar . |
| 3,259,390 | 7/1966 | Sanford . |
| 3,602,613 | 8/1971 | Gunther et al. . |
| 3,709,292 | 1/1973 | Palmour . |
| 3,810,634 | 5/1974 | Hakansson . |
| 3,943,717 | * 3/1976 | Schexnayder ................ 277/513 X |
| 4,146,237 | 3/1979 | Bergman . |
| 4,206,928 | 6/1980 | Assano . |
| 4,247,121 | 1/1981 | Bergman . |
| 4,428,584 | 1/1984 | Shapiro . |
| 4,483,141 | 11/1984 | Kobayashi et al. . |
| 4,703,835 | 11/1987 | Negrutsky et al. . |
| 4,769,992 | 9/1988 | Harada et al. . |
| 5,209,495 | 5/1993 | Palmour . |
| 5,820,129 | * 10/1998 | Reagan ............................ 277/318 X |

FOREIGN PATENT DOCUMENTS

| | | |
|---|---|---|
| 2.833.139 | 2/1979 | (DE) . |
| 1.236.013 | 6/1971 | (GB) . |

* cited by examiner

Primary Examiner—Robert J. Sandy
Assistant Examiner—Karlena D. Schwing
(74) Attorney, Agent, or Firm—James L. Jackson; Mayor, Day, Caldwell & Keeton, LLP

(57) ABSTRACT

In accordance with illustrative embodiments of the present invention, the arrangement of a combination stuffing box and pressure transmitter system for use with a reciprocating or rotating rod on pumps or pumping systems is disclosed. The stuffing box assembly includes a housing that holds a primary and second seal that are separated by a lubricating reservoir filled with a refined environmentally friendly sacrificial lubricant from the unknown fluid being pumped. The secondary seal transmits the pressure of the fluid being pumped to the sacrificial lubricant that is being sealed from the atmosphere by the primary seal. The secondary seal has its outside diameter sealing against the housing liner and has its inside diameter sealing on the pump rod. It is free to move with respect to the liner and the rod to transmit the pressure of the fluid being pumped to the sacrificial lubricant between the primary and secondary seals, as well as balance the pressure across the secondary seal. By design, any unbalance of pressure across the secondary seal will always be in the direction of the fluid being pumped. The primary seal operates under optimum conditions to prevent leakage of the refined safe lubricant, having known characteristics, to the environment.

22 Claims, 2 Drawing Sheets

STUFFING BOX SEAL ASSEMBLY

Applicant hereby claims the benefit of U.S. Provisional Application Ser. No. 60/091,941, filed on Jul. 7, 1998 by Harold H. Palmour and entitled "Stuffing Box Seal Assembly", which U.S. Provisional Application is incorporated by reference herein for all purposes.

BACKGROUND OF THE INVENTION

1. Field of the Invention

This invention relates to a new and simplified arrangement of a stuffing box assembly which is discussed herein in particular application to pumps having reciprocating or rotary pump rods but which is also applicable to any situation where an actuating rod or shaft penetrates through a wall and into a chamber containing a fluid, particularly an environmentally hazardous fluid under pressure. The present invention concerns a stuffing box assembly having an internal pressure transmitter piston used to equalize the pressure across the secondary seal in a stuffing box for reciprocating or rotating rods of pumping systems and to transmit the pressure of the fluid being pumped to a sacrificial safe-lubricant so the primary seal will be sealing a fluid of known characteristics. More particularly, the present invention is directed to reciprocating multiplex plunger pump stuffing boxes which include axially spaced primary and secondary seals that are separated by an annular chamber which contains a safe, refined, and clean lubricating fluid, such as a food grade hydraulic fluid. Even more particularly, the present invention concerns a stuffing box assembly having primary and secondary seals within a housing, with a safe lubricating fluid reservoir within the housing and arranged to contain a safe lubricating fluid therein at a pressure slightly exceeding the suction pressure of the pump, so that the secondary seal is substantially hydro-balanced with respect to suction pressure and both the primary and secondary seals are exceptionally well lubricated, thus permitting the packing assembly to have exceptionally long service life and to prevent leakage of pumped fluid to the environment.

2. Description of the Prior Art

One of the greatest sources of pollution of toxic fluids is the result of packing seals leaking when attempting to seal hazardous fluid under pressure. All plunger pumps used to transfer, load, circulate liquids, or produce oil wells with hydraulic pumps have, at one time or another, had to have the packing seal assemblies replaced because of leakage of the fluid being pumped due to wear to or damage of the packing seal assemblies by the pumped fluid. More and more oil wells are being produced with hydraulic pumping systems, and the horsepower requirements increase as the wells get deeper. As the pressure increases, the life of packing seals and pump plungers decreases. The application of this technology to multiplex plunger pumps as used in hydraulic pumping systems for producing oil wells will overcome the universal problem of losing production and polluting the area around the pumping unit.

In recent years progressive cavity pumps (P.C. pumps) have been developed for producing oil wells using rotating sucker rods. In P.C. pumping systems the stuffing box packing seals do not receive any lubrication from the fluid being pumped because the polished rod is rotating in the stuffing box instead of reciprocating, as compared with beam type pumping units, where the polished rod strokes down into the fluid being pumped. The greatest problem and maintenance requirement in P.C. pumping systems is controlling the leakage of produced fluid through the stuffing box seal around the rotating polished rod due to lack of lubrication, causing heat. The present invention helps solve the this problem in P.C. pumping systems, because the packing seals are pressure lubricated with clean refined fluid of known characteristics, and because hydro-balance is provided across the secondary seal. Maintenance cycles are greatly extended and no produced fluid will leak to the environment when the primary packing seal begins to leak.

The concept of hydro-balancing the pressure across the secondary seal of a stuffing box is the subject of U. S. Pat. No. 5,209,495 which is embodied in a commercial product for reciprocating sucker rod pumping systems. However, this patented technology has the pressure transmitter as a separate component of the stuffing box with the transmitter piston functioning in its own housing or cylinder.

SUMMARY OF THE INVENTION

This invention is an improvement over the teachings of prior U. S. Pat. No. 5,209,495 in that the pressure transmitter piston with the secondary seal is in the form of a floating piston in a liner or cylinder located within the housing of the stuffing box, sealing both the I.D. and the O.D. and separating the pumped fluid from a sacrificial safe-fluid and equalizing the pressure across the secondary seal. This new arrangement of the pressure transmitter/secondary seal is especially suited for use for a multiplex plunger pump and P.C. pumping systems.

The structure of the present invention provides for the transmitter piston to also serve as the secondary seal of the stuffing box packing assembly. The secondary seal/pressure transmitter piston has its O.D. in sealing contact with the liner of the stuffing box housing and has its I.D. in sealing contact with the rod. The pressure of the fluid being pumped is exposed to one side of the transmitter piston/secondary seal separating the fluid being pumped and the sacrificial safe-lubricant and the other side of the transmitter piston/secondary seal is exposed to the safe fluid in the lubricating chamber between the primary seal and the secondary seal/piston. Since the sacrificial safe-lubricant is confined in a closed safe fluid chamber, and the transmitter piston/secondary seal is free to travel inside the liner and on the pump rod. The pressure of the fluid being pumped is instantly transmitted through the piston/secondary seal to the safe-lubricant within the safe fluid chamber, thereby substantially balancing the pressure across the secondary seal. With virtually no pressure drop across the secondary seal, and being protected by a safe fluid such as a food grade lubricant or hydraulic oil, its life will be greatly extended. The primary seal is fixed and seals only the sacrificial safe-lubricant at the pressure of the fluid being pumped. The safe-lubricant is the only fluid that can leak to the atmosphere. Therefore the primary seal is functioning under optimum conditions to prevent leakage to the environment, because it seal a fluid having known characteristics. As a result, its life is extended.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

IN THE DRAWINGS

Figure 1:
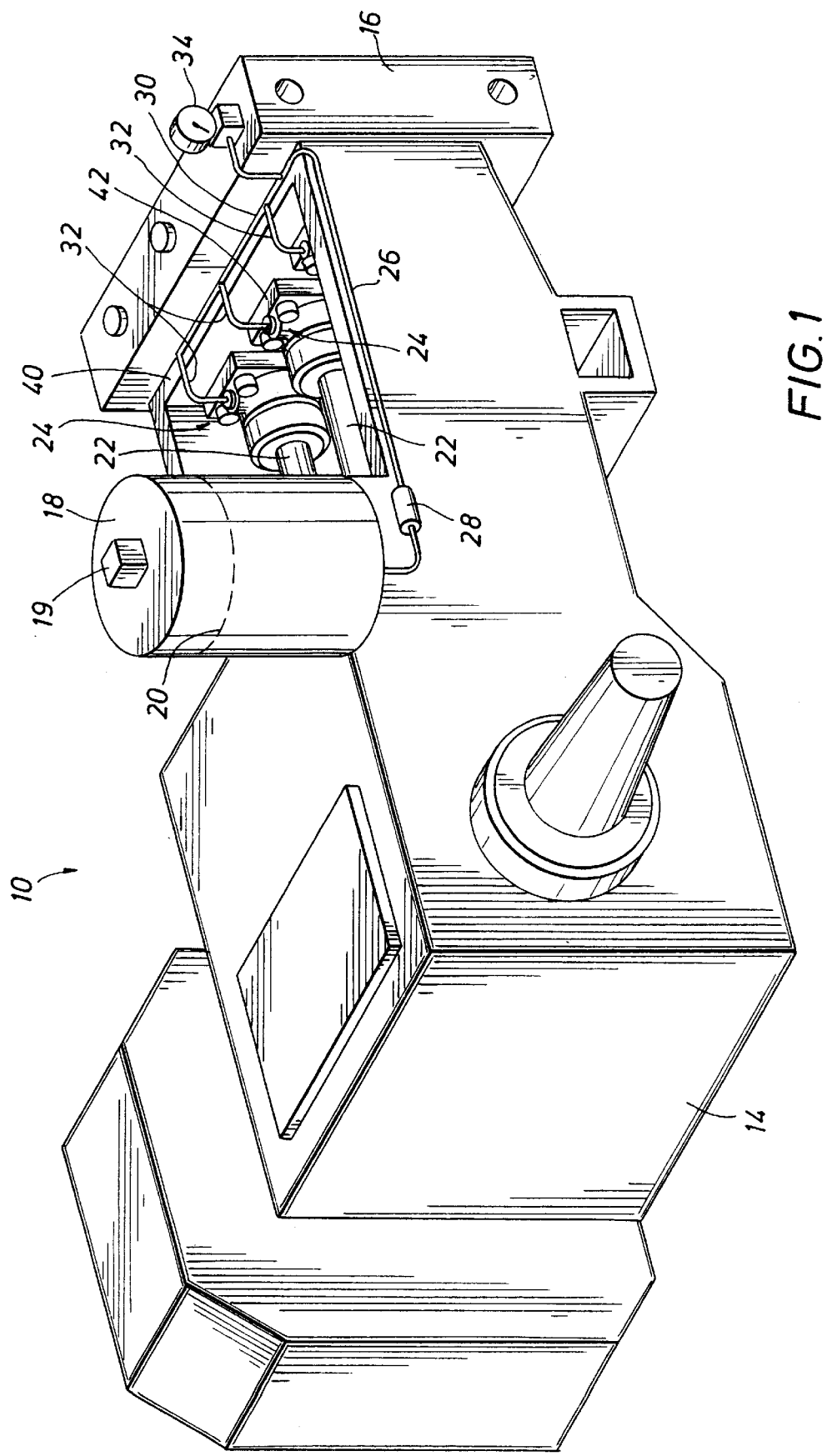
Figure 2:
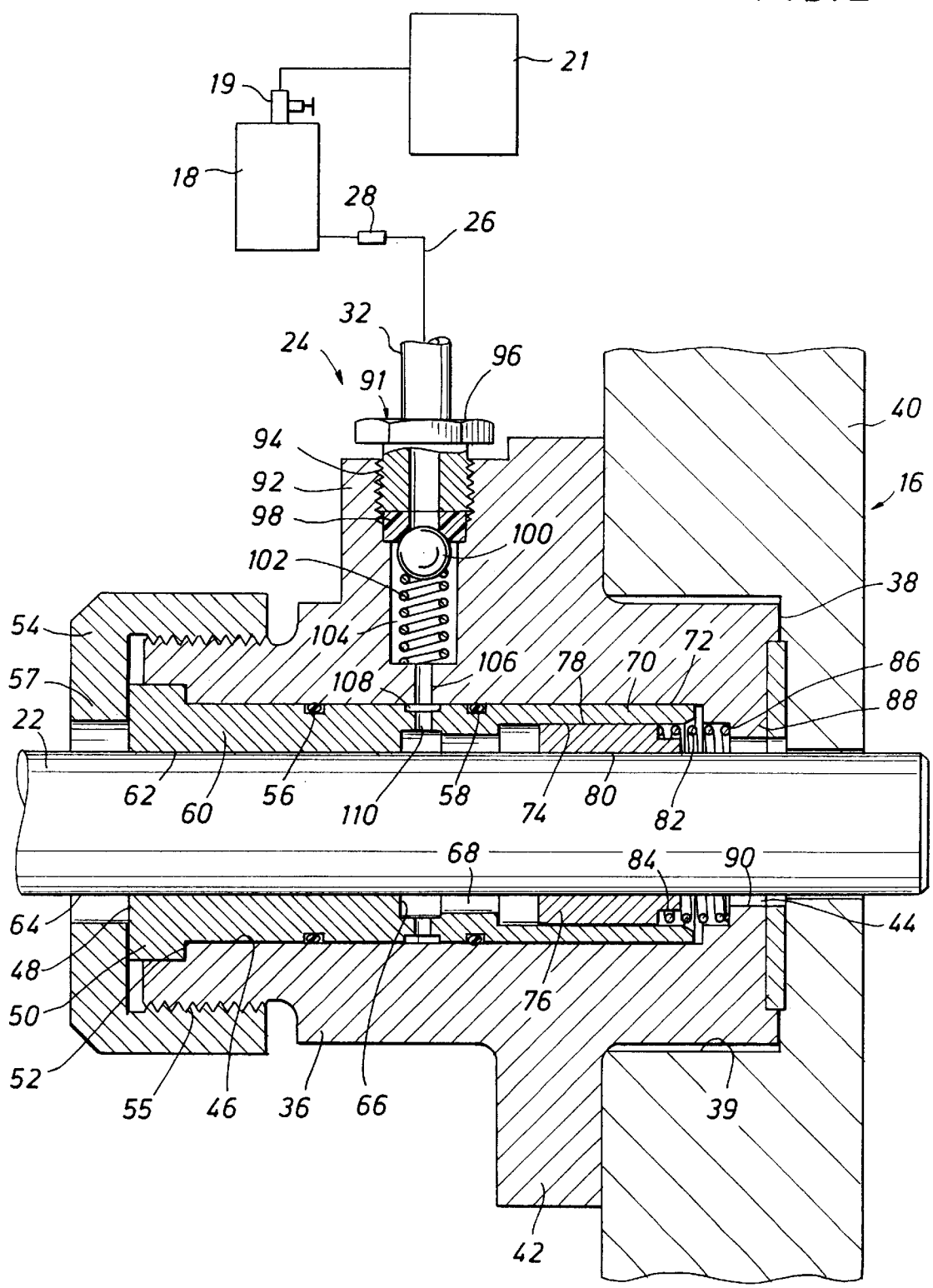

FIG. 1 is an isometric illustration of a triplex pump having a hydro-balanced plunger packing system embodying the principles of the present invention and representing the preferred embodiment of the invention; and FIG. 2 is a sectional view showing one of the hydro-balanced plunger stuffing box assemblies of FIG. 1 and further showing schematically an arrangement for providing a safe fluid feed to the lubrication reservoir of the hydro-balanced plunger packing assembly.

DETAILED DESCRIPTION OF PREFERRED EMBODIMENT

Referring now to the drawings and first to FIG. 1, a triplex pump having the hydro-balanced plunger packing system in association therewith is shown generally at 10 and incorporates a pump body 12 having a power end 14 and a fluid end 16. Mounted to the pump body 12 is a safe-fluid supply tank or reservoir 18 containing a quantity of environmentally safe fluid ,such as food grade hydraulic oil 20. The safe-fluid supply tank or reservoir 18 is maintained in any suitable manner, such as by an accumulator or other pressure source 21 as shown schematically in FIG. 2, at a safe fluid supply pressure which is slightly above the suction pressure of the pump, such as in the range of from about 15 psi to about 25 psi above pump suction pressure. As an example the lubricant pressure may be supplied by an accumulator 21 or other suitable pressure source as shown schematically in FIG. 2, which is connected to the safe-fluid supply tank or reservoir 18 at a valve controlled accumulator connection 19. For fluid pumping, the triplex pump incorporates a mechanism for reciprocating a plurality of pump rods 22 which are reciprocated within packing or stuffing box assemblies shown generally at 24. A safe-fluid feed conduit 26, controlled by a safety check valve 28 extends from the safe-fluid reservoir 18 and provides safe-fluid feed to a feed conduit manifold 30 having a plurality of safe-fluid branch conduits 32 each being connected to safe-fluid inlet ports of the respective packing or stuffing box assemblies 24. The pressure of the safe-fluid feed conduit 26 is monitored by a feed line pressure gauge 34.

Referring now to FIG. 2, one of the stuffing box assemblies is shown generally at 24 and has a stuffing box housing 36 defining a housing end 38 that is adapted to extend into a stuffing box locator recess 39 that is present within the fluid end wall 40 of the pump body and to be received within the fluid end 16 of the pump. The stuffing box housing 36 is provided with a connecting flange 42 which enables bolted mounting of the body structure to the fluid end wall 40 of the pump body.

The stuffing box housing 36 is machined or otherwise formed to define an internal packing chamber 44 which is defined in part by an internal cylindrical wall or bore 46 and through which one of the pump rods 22 extends for reciprocation during pumping activity. A packing sleeve 48 is seated within the internal packing chamber 46 and is positioned by a flange structure 50 thereof which is received within a sleeve recess 52 as shown. A packing retainer 54 is secured by threaded interconnection 55 with an externally threaded section of the stuffing box housing 36 and provides a retainer flange 57 which engages the packing sleeve 48 and retains the packing sleeve 48 in seated relation within the packing chamber of the stuffing box housing 36. The packing sleeve is sealed with respect to the internal cylindrical surface 46 of the stuffing box housing 36 by circular sealing elements 56 and 58 which are retained within circular axially spaced seal grooves defined in the packing sleeve 48. The packing sleeve defines a primary packing section 60 which defines an internal cylindrical surface 62 that is disposed in close fitting sealing engagement with the outer cylindrical surface 64 of the pump rod 22. The packing sleeve 48 is enlarged internally to define a circular shoulder 66 which forms one axial end of an annular lubrication safe fluid chamber 68 containing a quantity of safe-lubricant such as a food grade hydraulic oil or other suitable environmentally safe lubricant composition. The hydraulic oil or other suitable environmentally safe lubricant provides lubrication to the sealing interface of the sealing surface 62 of the primary packing section with the external cylindrical sealing surface 64 of the pump rod. The lubricant also serves to lubricate a secondary packing as will be discussed below.

The packing sleeve 48 further defines a tubular housing liner section 70 having a cylindrical external surface 72 in close fitting static relation with the inner cylindrical surface 46 of the stuffing box housing 36. The tubular housing liner section 70 defines an inner cylindrical surface 74 which is disposed in annular spaced and concentric relation with the external cylindrical surface 64 of the pump rod 22. A transmitter piston element 76 is movably located within the annular space between the pump rod surface 64 and the internal cylindrical surface 74 of the tubular housing liner section and defines an external cylindrical sealing surface 78 having sealing engagement with the internal sealing surface 74. The transmitter piston element 76 also defines an internal cylindrical sealing surface 80 having sealing engagement with the external cylindrical sealing surface 64 of the pump rod 22. The transmitter piston element is maintained in forcible contact with the hydraulic safe-lubricant within the safe fluid chamber 68 by a transmitter spring 82 having the respective ends thereof seated within spring receptacles defined by annular recesses 84 and 86 which are defined respectively in the transmitter piston element and a circular internally extending flange 88 of the stuffing box housing 36. The circular internally extending flange 88 defines an annular internal surface 90 which is disposed in annularly spaced relation with the external cylindrical surface 64 of the pump rod 22 so as to permit communication of the pumped fluid medium into the internal chamber of the stuffing box housing and in contact with the transmitter piston element. This feature permits pump suction pressure to act on one axial end of the transmitter piston element while the safe-lubricant within the lubricant reservoir 68 acts on the opposite end of the transmitter piston element.

The stuffing box housing 36 is provided with a demand responsive lubricant inlet control which is defined by an inlet connection receptacle 92 having an internally threaded section 94 receiving a check valve retainer element 96 which also serves as an inlet connector element for a safe-lubricant inlet tube connector. A check valve seat 98 is shouldered within the inlet connection receptacle 92 and has a check valve element 100 maintained in seated engagement therewith by a check valve spring 102. The check valve spring 102 is located within a spring receptacle 104 that also serves as a flow passage for conducting safe-lubricant to the lubricant safe fluid chamber 68. The stuffing box body is provided with a fluid supply passage 106 which is in fluid communication with an external annular lubricant distribution recess 108 that is defined by the outer periphery of the packing sleeve 48. A plurality of fluid communication openings 110 are present in the packing sleeve 48 in the region of the safe-lubricant reservoir 68 and intersect the external annular lubricant distribution recess 108 of the packing sleeve 48. The fluid communication openings 110 serve to conduct safe-lubricant from the external annular lubricant distribution recess 108 to the safe-lubricant reservoir to maintain the safe fluid chamber 68 filled with safe fluid, typically a lubricant such as food grade oil or hydraulic oil, at all times and to replenish any safe lubricant that may have leaked along the secondary seal/pressure transmitting piston to the fluid being pumped.

Operation

In operation on each cylinder of the multiplex pump the pressure in the cylinder will be vented to a pressure transmitter through the liquid being pumped and being present within the annular chamber 44. This pressure is transmitted from the transmitter piston 76 through a safe, sacrificial lubricating fluid to the stuffing box packing seals. The stuffing box assembly has three basic sections: (a) a primary sealing area defined by the internal cylindrical surface 62 of the primary packing section 60, (b) a lubrication reservoir area defined by the safe-lubricant safe fluid chamber 68, and (c) a secondary sealing area defined by the internal cylindrical sealing surface 80 of the piston transmitter 76. The pressure in the multiplex pump cylinder, communicated into the annular space 44 and the pressure of the lubricant within the safe-lubricant chamber 68 of the stuffing box housing 36 for that cylinder will always be the same or balanced, through the transmitter piston 76, on the power stroke of the plunger or pump rod 22 (high pressure stroke). The fluid being pumped and the lubricating fluid are separated from the secondary packing seal of the stuffing box which is defined by the internal cylindrical sealing surface 80 of the transmitter piston. There is substantially no pressure drop across the secondary seal during the power stroke. As a result, this seal has a significantly extended service life as compared to prior stuffing box packing seals. On the suction stroke there is a very low pressure drop (approximately 15 psi) across the secondary seal defined by the transmitter piston 76. This pressure drop will be in the direction from the safe fluid chamber 68 toward the fluid being pumped. Therefore, if there is any transfer of fluid or leakage across this seal, it is the safe lubricating fluid going toward and into the fluid being pumped. Such leakage can only be a very minute amount of lubricant due to the low pressure drop and the time period when there is any differential pressure at all. This fact also prevents abrasives that may be entrained within the pumped fluid from entering the interface of the secondary seal, defined by the inner cylindrical surface 80 of the transmitter piston 76, with the outer cylindrical surface 64 of the pump rod 22 and also prevents abrasives from entering the interface of the internal cylindrical surface 74 of the housing liner 70 of the packing sleeve 48 and the outer cylindrical surface 78 of the transmitter piston. As a result, this seal has a significantly extended service life as compared to prior stuffing box packing seals. On the suction stroke there is a very low pressure drop (approximately 15 psi) across the secondary seal defined by the transmitter piston 76. This pressure drop will be in the direction from the lubricating reservoir 68 toward the fluid being pumped. Therefore, if there is any transfer of fluid or leakage across this seal, it is the safe lubricating fluid going toward and into the fluid being pumped. Such leakage can only be a very minute amount of lubricant due to the low pressure drop and the time period when there is any differential pressure at all. This fact also prevents abrasives that may be entrained within the pumped fluid from entering the interface of the secondary seal, defined by the inner cylindrical surface 80 of the transmitter piston 76, with the outer cylindrical surface 64 of the pump rod 22 and also prevents abrasives from entering the interface of the internal cylindrical surface 74 of the housing liner 70 of the packing sleeve 48 and the outer cylindrical surface 78 of the transmitter piston.

The high pressure drop (operating pressure versus atmospheric pressure) is present from the safe fluid chamber 68 across the primary seal 60–62. This primary seal holds the known safe lubricating fluid which is controlled by the operator and can be any fluid that is desirable for the maximum life of the primary packing seal material used. Also, the safe lubricating fluid is environmentally friendly, such as food grade hydraulic oil.

Using the present invention with a Unidraulic Hydraulic Pumping System, the make up feed system of the safe lubricating fluid is simple. The reservoir of safe fluid may be pressure charged from the vertical vessel by regulated gas pressure to the optimum pressure above the suction pressure of the multiplex pump.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A combination of a substantially hydro-balanced stuffing box assembly in a pump defining at least one pump rod having an outer sealing surface, comprising:

(a) a stuffing box housing defining an internal packing chamber for communication with a fluid being pumped and having a portion of the pump rod extending therethrough;

(b) a primary seal being located within said internal packing chamber and in sealing relation with said stuffing box housing and having sealing engagement with the pump rod;

(c) a safe fluid chamber being defined within said internal packing chamber and having a safe fluid therein in contact with said primary seal; and (d) a pressure transmitter element being movable within said internal packing chamber and being sealed with said primary seal and together with a portion of said primary seal defining a secondary seal disposed in sealing engagement with the pump rod, said pressure transmitter element having a portion thereof exposed to the pressure of the fluid being pumped and having a portion thereof exposed to said safe fluid, said pressure transmitter element transmitting pump pressure to said safe fluid within said safe fluid chamber and substantially pressure balancing said secondary seal with pump pressure to minimize wear thereof during pumping activity.

2. The substantially hydro-balanced stuffing box assembly of claim 1, comprising:

(a) said primary seal being disposed in fixed relation with said stuffing box housing and being sealed to said stuffing box housing and to the pump rod and defining an annular secondary seal section located circumferentially about and in spaced relation with the pump rod; and (b) said pressure transmitter element and said secondary seal section of said primary seal defining a secondary seal within said internal packing chamber, said pressure transmitter element disposed in movable relation within said packing chamber being sealed to said secondary seal section and to the pump rod and defining a movable partition between said safe fluid and the fluid being pumped and substantially balancing the pressure of said safe fluid with the pressure of the fluid being pumped.

3. The substantially hydro-balanced stuffing box assembly of claim 1, wherein the pump has a suction pressure and a discharge pressure, said substantially hydro-balanced stuffing box assembly comprising:

a pressure source maintaining said safe fluid within said safe fluid supply reservoir at a pressure slightly above the suction pressure of the pump, causing any leakage of said secondary seal to result in safe fluid movement toward the fluid being pumped and preventing movement of the fluid being pumped past said pressure transmitter element and into said safe fluid.

4. The substantially hydro-balanced stuffing box assembly of claim 1, wherein the pump has a suction pressure and a discharge pressure and said substantially hydro-balanced stuffing box assembly comprising:

(a) a source of safe fluid having a pressure slightly above the suction pressure of the pump; and (b) a lubricant inlet control disposed in demand responsive safe fluid supplying communication with said safe fluid reservoir.

5. The substantially hydro-balanced stuffing box assembly of claim 4, wherein:

(a) said source of safe fluid being a safe fluid supply reservoir having a pressure source in connection therewith; and (b) said safe fluid inlet control being a check valve mechanism permitting inlet of safe fluid into said safe fluid chamber and preventing flow of safe fluid from said safe fluid chamber toward said safe fluid supply reservoir.

6. The substantially hydro-balanced stuffing box assembly of claim 5, comprising:

(a) a safe fluid supply passage being defined by said stuffing box housing and communicating said safe fluid inlet control with said packing chamber; and (b) said packing sleeve defining at least one inlet port conducting safe fluid from said safe fluid supply passage into said safe fluid chamber.

7. The substantially hydro-balanced stuffing box assembly of claim 6, comprising:

(a) said safe fluid inlet control being a check valve mechanism arranged to permit inlet of safe fluid into the safe fluid chamber and prevent reverse flow of safe fluid from the safe fluid chamber through said check valve mechanism; and (b) said lubricant supply passage being located between said spaced seals.

8. The substantially hydro-balanced stuffing box assembly of claim 6, comprising:

a transmitter spring located within said internal packing chamber and applying an urging force to said pressure transmitter element, said urging force acting toward said safe fluid chamber.

9. The substantially hydro-balanced stuffing box assembly of claim 1, comprising:

(a) said packing sleeve further defining said safe fluid chamber and defining a tubular housing liner disposed about the pump rod;

(b) a pair of sealing elements disposed in spaced relation and sealing said packing sleeve with respect to said stuffing box housing; and (c) said pressure transmitter element being a pressure transmitter piston element of annular configuration and having an internal cylindrical surface in sealing contact with said pump rod and an external cylindrical surface in sealing contact with said tubular housing liner.

10. The substantially hydro-balanced stuffing box assembly of claim 9, comprising:

(a) a safe fluid supply passage being defined by said stuffing box housing and intersecting said packing chamber at a location between said spaced seals; and (b) said packing sleeve defining at least one safe fluid inlet port communicating said safe fluid supply passage with said safe fluid chamber.

11. The substantially hydro-balanced stuffing box assembly of claim 9, comprising:

(a) a safe fluid supply passage being defined by said stuffing box housing and intersecting said packing chamber at a location between said spaced seals; and (b) said packing sleeve defining at least one safe fluid inlet port communicating said safe fluid supply passage with said safe fluid chamber.

12. A combination of a substantially hydro-balanced stuffing box assembly in a pump mechanism having at least one pump actuating rod defining an outer sealing surface and having a portion of the actuating rod being exposed for contact with a pumped fluid having a pump pressure, comprising:

(a) a stuffing box housing defining an internal packing chamber and having the actuating rod extending therethrough;

(b) a packing sleeve being secured in substantially immovable relation within said internal packing chamber and being sealed to said stuffing box housing and to the pump actuating rod;

(c) a safe fluid chamber being defined within said packing sleeve;

(d) a pressurized supply of safe fluid being communicated to said safe fluid chamber; and (e) a pressure transmitter element being movable within said packing sleeve and defining a secondary seal disposed in sealing engagement with said packing sleeve and with the pump actuating rod, said pressure transmitter element having a portion thereof in contact with the pumped fluid and having a portion thereof in contact with said safe fluid, said pressure transmitter element transmitting pumped fluid pressure to said safe fluid within said safe fluid chamber and substantially pressure balancing safe fluid pressure with pumped fluid pressure and substantially isolating said safe fluid chamber from the pumped fluid.

13. The substantially hydro-balanced stuffing box assembly of claim 12, comprising:

means maintaining said safe fluid at a pressure slightly above the pressure of the pumped fluid, causing any leakage of said secondary seal to result in leaked safe fluid movement toward the pumped fluid and preventing movement of the pumped fluid to said safe fluid chamber.

14. The substantially hydro-balanced stuffing box assembly of claim 12, comprising:
    (a) said source of safe fluid having a pressure slightly above pumped fluid pressure; and
    (b) a safe fluid inlet control disposed in demand responsive safe fluid supplying communication with said safe fluid chamber.

15. The substantially hydro-balanced stuffing box assembly of claim 14, wherein:
    (a) said source of safe fluid being a safe fluid supply reservoir having a pressure source in connection therewith; and
    (b) said safe fluid inlet control being a check valve mechanism permitting inlet of safe fluid into said safe fluid reservoir and preventing flow of safe fluid from said safe fluid reservoir toward said source of safe fluid.

16. The substantially hydro-balanced stuffing box assembly of claim 15, comprising:
    (a) a safe fluid supply passage being defined by said stuffing box housing and communicating said safe fluid inlet control with said packing chamber;
    (b) said packing sleeve defining safe fluid inlet ports conducting safe fluid from said safe fluid supply passage into said safe fluid chamber.

17. The substantially hydro-balanced stuffing box assembly of claim 15, comprising:
    (b) said safe fluid inlet control being a check valve mechanism arranged to permit inlet of safe fluid into the safe fluid chamber and prevent reverse flow of safe fluid from the safe fluid chamber through said check valve;
    (b) a pair of spaced seals establishing sealing of said packing sleeve with said stuffing box housing; and
    (c) said safe fluid supply passage being communicated with said safe fluid chamber between said spaced seals.

18. The substantially hydro-balanced stuffing box assembly of claim 15, comprising:
    (a) said pressure transmitter element being an annular pressure transmitter piston being linearly moveable within said packing chamber; and
    (b) a transmitter spring located within said packing chamber and applying an urging force to said annular pressure transmitter piston, said urging force acting toward said safe fluid chamber.

19. The substantially hydro-balanced stuffing box assembly of claim 12, comprising:
    (a) said secondary packing section of said packing sleeve defining said safe fluid chamber and defining a tubular housing liner disposed concentrically about and in spaced relation with the pump actuating rod;
    (b) a pair of sealing elements disposed in spaced relation and sealing said packing sleeve with respect to said stuffing box housing; and
    (c) said pressure transmitter element being a pressure transmitter piston element of annular configuration and having an internal cylindrical surface in sealing contact with said actuating rod and an external cylindrical surface in sealing contact with said tubular housing liner.

20. The substantially hydro-balanced stuffing box assembly of claim 12, comprising:
    a transmitter spring located within said packing chamber and applying an urging force to said transmitter piston, said urging force acting toward said safe fluid chamber.

21. A combination of a substantially hydro-balanced stuffing box assembly in a pump mechanism having at least one actuating rod defining an outer sealing surface and having a portion of the actuating rod being exposed for contact with a pumped fluid having a pump pressure, comprising:
    (a) a stuffing box housing defining an internal packing chamber and having the actuating rod extending therethrough;
    (b) a packing sleeve being secured in substantially immovable relation within said internal packing chamber and defining a primary seal section being sealed to said stuffing box housing and to the actuating rod and defining a secondary seal section being sealed to said stuffing box housing and being spaced from the actuating rod;
    (c) a safe fluid chamber being defined within said secondary seal section of said packing sleeve;
    (d) a pressurized supply of safe fluid being communicated to said safe fluid chamber; and
    (e) a pressure transmitter element being movable within said secondary seal section of said packing sleeve and together with said secondary seal section defining a movable secondary seal disposed in sealing engagement with said packing sleeve and with the actuating rod, said pressure transmitter element having a portion thereof in contact with the pumped fluid and having a portion thereof in contact with said safe fluid, said pressure transmitter element transmitting pumped fluid pressure to said safe fluid within said safe fluid chamber and substantially pressure balancing said safe fluid pressure with pumped fluid pressure and substantially isolating said safe fluid chamber from the pumped fluid.

22. A combination of a substantially hydro-balanced stuffing box assembly in a pump mechanism having at least one actuating rod defining an outer sealing surface and having a portion of the actuating rod being exposed for contact with a pumped fluid having a pump pressure, comprising:
    (a) a stuffing box housing defining an internal packing chamber and having the actuating rod extending therethrough;
    (b) a packing sleeve being secured in substantially immovable relation within said internal packing chamber and being sealed to said stuffing box housing and to the actuating rod;
    (c) a safe fluid chamber being defined within said packing sleeve;
    (d) a pressurized supply of safe fluid being in fluid communication with said safe fluid chamber; and
    (e) a pressure transmitter element being movable within said packing sleeve and together with a portion of said packing sleeve defining a movable secondary seal within said internal packing chamber of said stuffing box housing being disposed in sealing engagement with the actuating rod, said pressure transmitter element having a portion thereof in contact with the pumped fluid and having a portion thereof in contact with said safe fluid, said pressure transmitter element transmitting pumped fluid pressure to said safe fluid within said safe fluid chamber and substantially balancing safe fluid pressure with pumped fluid pressure and substantially isolating said safe fluid chamber from the pumped fluid.

* * * * *

UNITED STATES PATENT AND TRADEMARK OFFICE
CERTIFICATE OF CORRECTION

PATENT NO.    : 6,302,401 B1
DATED         : October 16, 2001
INVENTOR(S)   : Harold H. Palmour It is certified that error appears in the above-identified patent and that said Letters Patent is hereby corrected as shown below:

Column 2,
Line 3, delete "the", first occurrence.
Line 55, delete "seal", insert -- seals --

Column 3,
Line 25, delete "fluid ,such", insert -- fluid, such --

Column 7,
Line 35, delete "reservoir", insert -- chamber --
Line 61, delete "and", and insert -- (b) a pair of spaced seals establishing sealing of said packing sleeve with said stuffing box assembly; and --

Signed and Sealed this

Sixth Day of August, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,302,401 B1  Page 1 of 1
DATED : October 16, 2001
INVENTOR(S) : Harold H. Palmour It is certified that error appears in the above-identified patent and that said Letters Patent is hereby corrected as shown below:

Column 2,
Line 3, delete "the", first occurrence.
Line 55, delete "seal", insert -- seals --

Column 3,
Line 25, delete "fluid ,such", insert -- fluid, such --

Column 7,
Line 35, delete "reservoir", insert -- chamber --
Line 61, delete "and", insert -- (b) a pair of spaced seals establishing sealing of said packing sleeve with said stuffing box assembly; and --
Line 62, delete "(b)", insert -- (c) --

This certificate supercedes Certificate of Correction issued August 6, 2002.

Signed and Sealed this

Twenty-fourth Day of December, 2002

JAMES E. ROGAN
*Director of the United States Patent and Trademark Office*